United States Patent [19]

Kazaoka et al.

[11] Patent Number: 4,850,644
[45] Date of Patent: Jul. 25, 1989

[54] SEAT STRUCTURE FOR VEHICLES

[75] Inventors: Kenichi Kazaoka, Nagoya; Hiroshi Okazaki, Kariya, both of Japan

[73] Assignee: Aisin Seiki Kabushiki Kaisha, Japan

[21] Appl. No.: 191,798

[22] Filed: May 3, 1988

Related U.S. Application Data

[63] Continuation of Ser. No. 911,903, Sep. 26, 1986.

[30] Foreign Application Priority Data

Sep. 30, 1985 [JP] Japan .................. 60-216971

[51] Int. Cl.⁴ .................................. A47C 1/02
[52] U.S. Cl. .................... 297/325; 297/329; 297/452
[58] Field of Search .............. 297/452, 341, 322, 325, 297/326–329

[56] References Cited

U.S. PATENT DOCUMENTS

| | | | |
|---|---|---|---|
| 3,319,921 | 5/1967 | Nichols | 248/394 X |
| 3,529,866 | 9/1970 | Getz | 297/452 |
| 4,364,607 | 12/1982 | Tamburini | 297/452 |
| 4,475,707 | 10/1984 | Foster | 248/430 |
| 4,492,408 | 1/1985 | Lohr | 248/429 |
| 4,520,982 | 6/1985 | Nishino | 248/430 |
| 4,601,517 | 7/1986 | Heesch | 297/452 |
| 4,606,532 | 8/1986 | Kazaoka et al. | 297/452 |
| 4,615,551 | 10/1986 | Kinaga et al. | 297/341 |
| 4,623,114 | 11/1986 | Nishino | 297/452 |
| 4,624,503 | 11/1986 | Kazunori | 297/452 |

FOREIGN PATENT DOCUMENTS

0008124  1/1985  Japan .................. 297/361

Primary Examiner—Francis K. Zugel
Attorney, Agent, or Firm—Finnegan, Henderson, Farabow, Garrett & Dunner

[57] ABSTRACT

A seat structure for automobiles includes a pair of seat hinges provided at both side of the seat and a connecting member disposed between the seat hinges for connecting them. The seat structure further includes a support member on the connecting member for securing seat cushion to the seat hinges.

15 Claims, 7 Drawing Sheets

SEAT STRUCTURE FOR VEHICLES

This application is a continuation of application Ser. No. 911,903, filed 9/26/86.

FIELD OF THE INVENTION

This invention relates to a seat for automobiles and more particularly to seat cushion frame structures of automobiles.

BACKGROUND OF THE INVENTION

Figure 6:
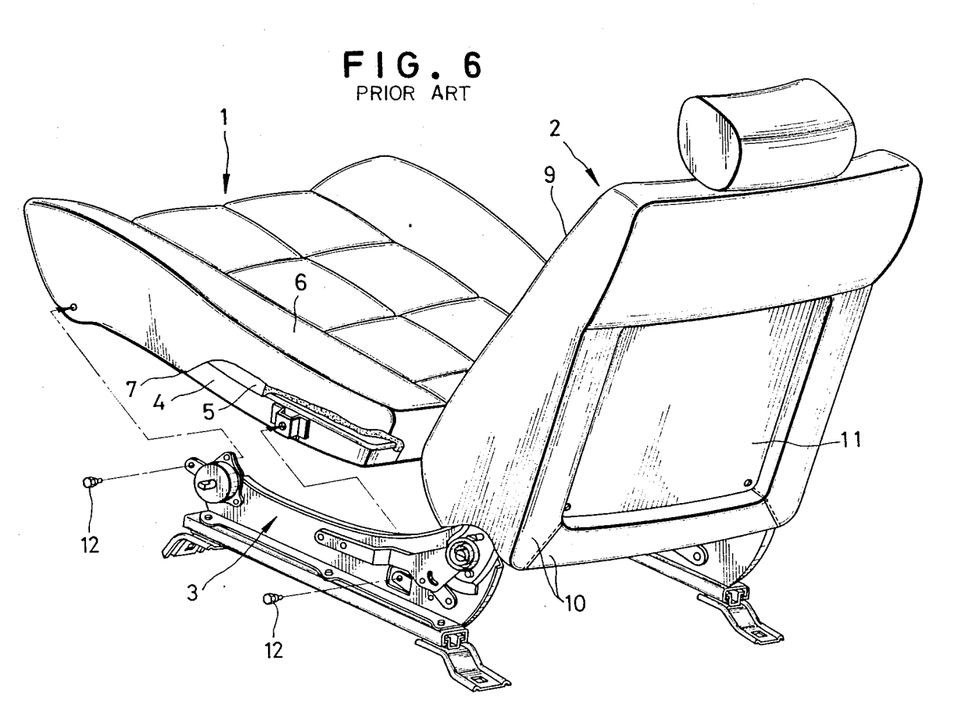
FIG. 6 is a partial perspective view of the conventional seat.
Figure 7:
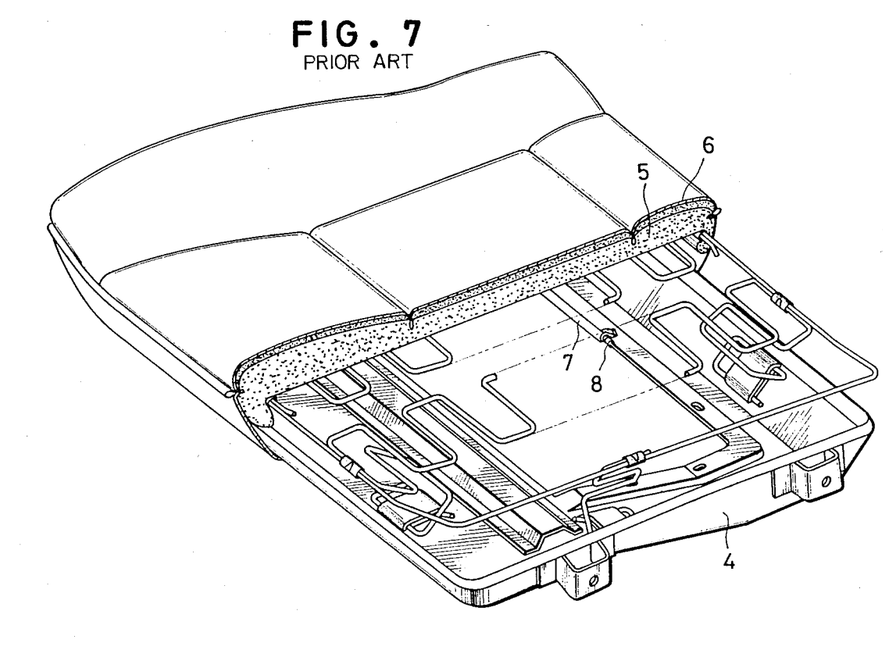
FIG. 7 is a perspective view of the conventional seat cushion.

Conventionally, as is shown in FIGS. 6 or 7, an automobile seat is constructed by a seat cushion 1, seatback cushion 2 and seat adjuster unit 3. When assembling, seat cushion 1 and seatback cushion 2 are independently formed in order to cover the cushions 1 and 2 by separate cover materials. As shown in FIG. 7, cushion material 5 of the seat cushion 1 is fixed on a seat cushion pan 4 and cover material 6 is put on the cushion material 5. The end portion 7 of the cover material 6 is put under the cushion pan 4 to be secured thereto by clip means 8.

As shown in FIG. 6, seatback cushion 2 includes cushion material and seatback frame (not shown) secured to the cushion material. Seat adjuster 3 is secured to the cushion and cover material 9 is attached over the seatback frame by clip means at an end portion 10 of the cover material 9. Cover 11 is finally attached to the assembly to form the seatback cushion 2. Seat cushion 1 is secured to the seatback cushion 2 by bolt means 12 through seat adjuster 3 which is integrally secured to the seatback cushion 2.

This conventional seat assembly, however, has a drawback that since the connection between the two cushion portions are made through bolt and pin connection at the relatively thin seat cushion pan, load concentration at the connecting portion will cause to reduction of rigidity and strength. If a reinforcement is attached to the connecting portion in order to cover the strength or rigidity, weight will be increased, which leads to the cost increase.

SUMMARY OF THE INVENTION

It is therefore an object of the present invention to provide an improved seat assembly for automobiles.

It is another object of the present invention to provide an improved seat assembly which obviates the above conventional drawbacks.

According to the present invention, a pair of seat hinge means are provided at both sides of the seat and each front portion of their hinge means is connected to the front portion by a connecting means. The connecting means is provided with a seat cushion support member to which a means is provided for securing the cover material of the seat cushion to the seat hinge means.

BRIEF DESCRIPTION OF THE DRAWINGS

These and other features of the present invention will be apparent from the following description of the invention with reference to the attached drawings in which.

DETAILED DESCRIPTION OF THE EMBODIMENT

Figure 1:
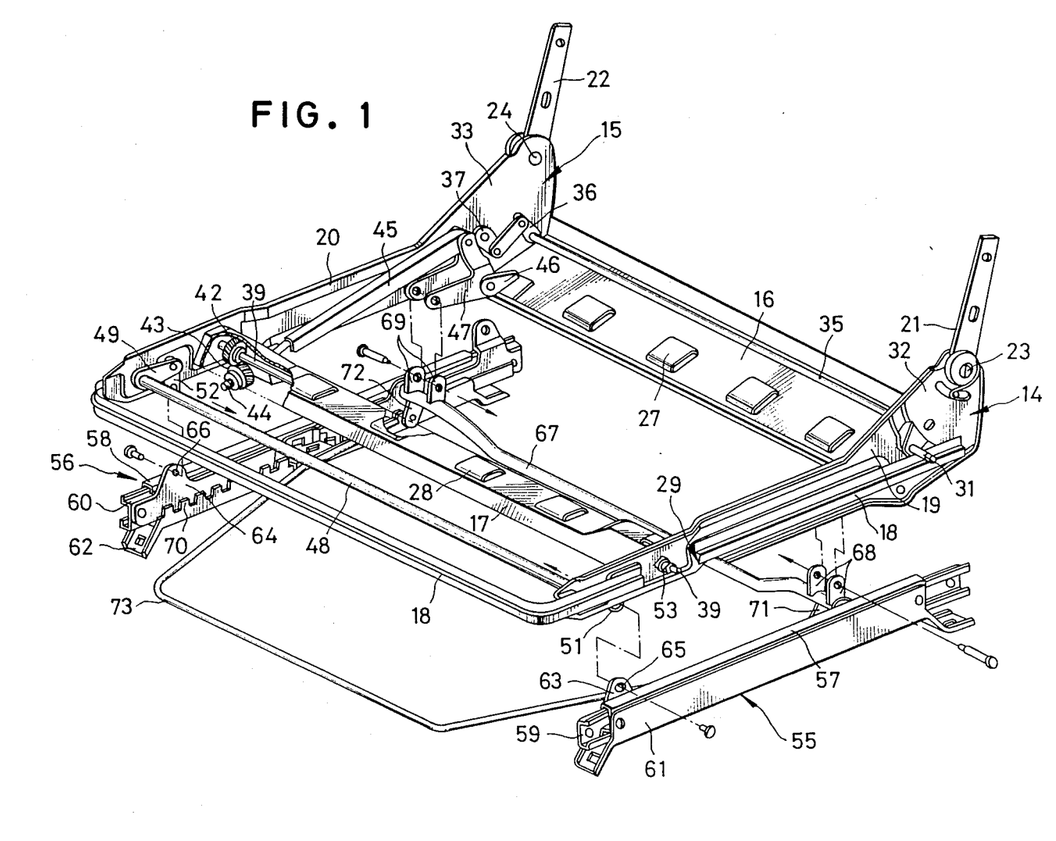
FIG. 1 is a perspective view of the seat according to the present invention.
Figure 2:
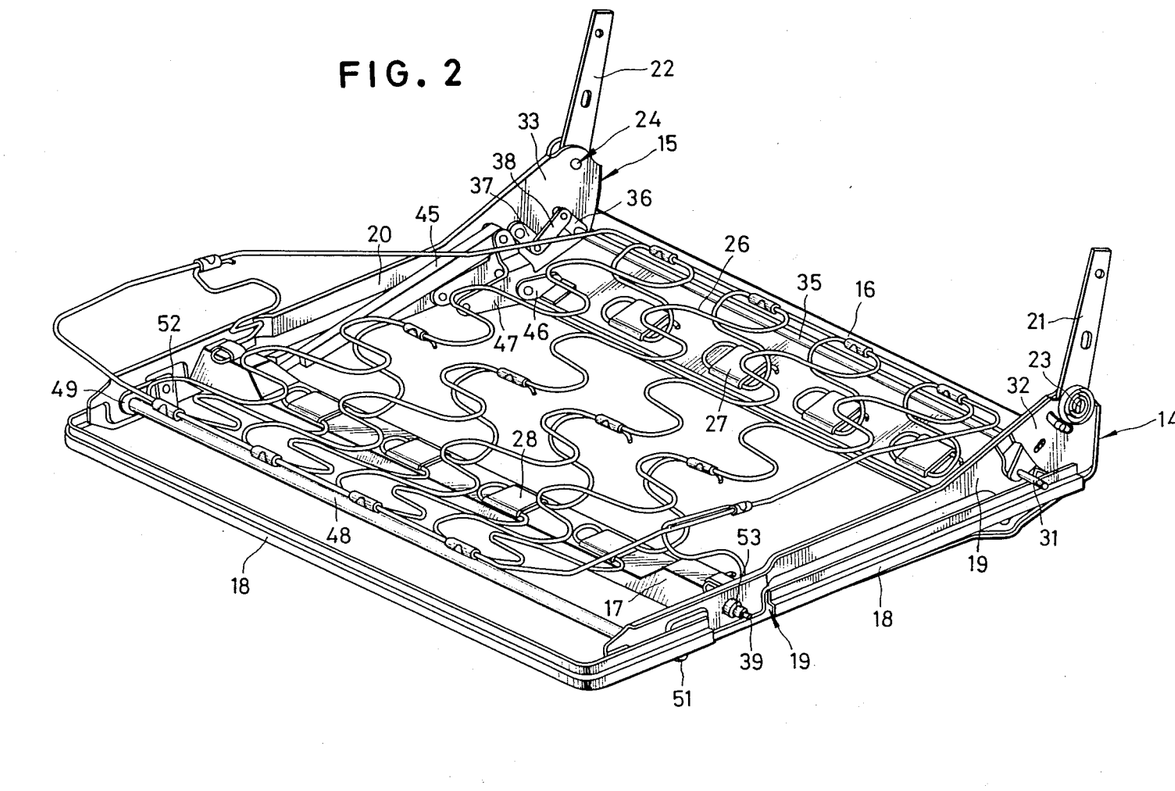
FIG. 2 is a perspective view which shows the relation between the seat hinge and seat spring.
Figure 3:
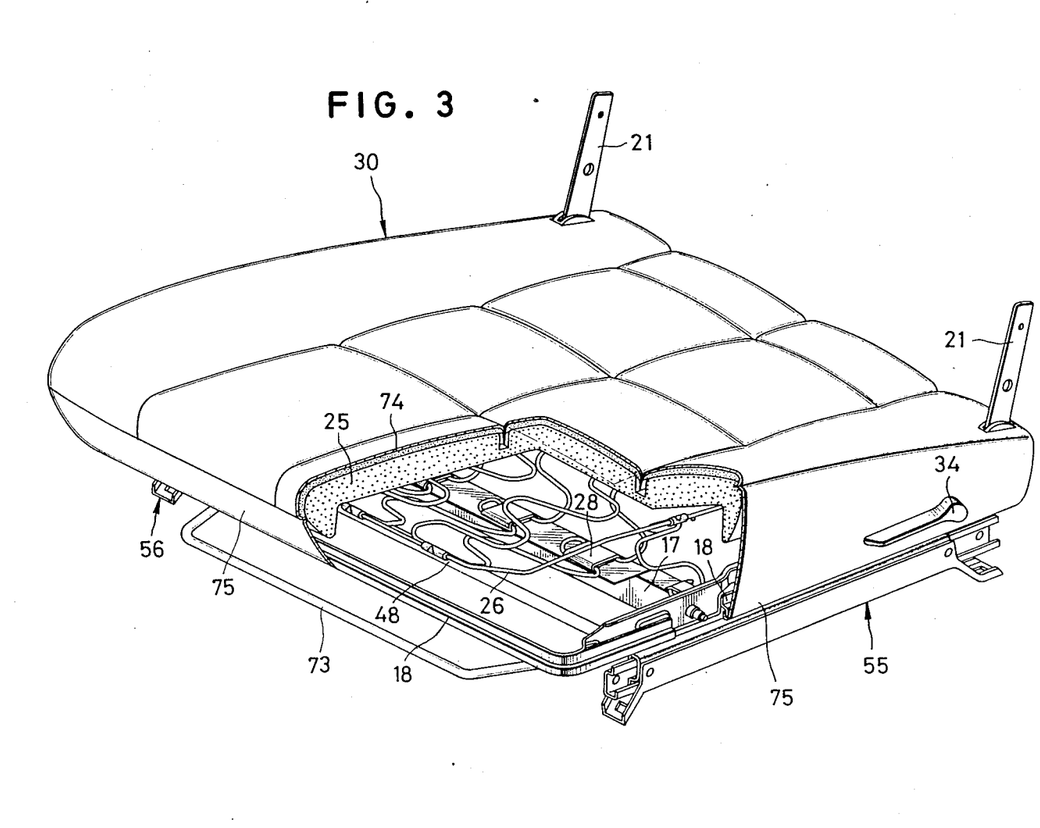
FIG. 3 is a partial perspective view of a seat cushion assembly.

Referring now to the drawings, lower arm 19 and upper arm 21 are rotatably connected to each other about a shaft 23 through seat hinge 14. Similarly, a lower arm 20 and upper arm 22 are rotatably connected to each other about a shaft 24 through seat hinge 15. The lower arms 19 and 20 are in elongated shape in forward direction and at their rear ends an L-shaped connecting member 16 is provided for connecting the both lower arms 19 and 20. Such connecting member 16 may be formed integral with the lower arms 19 and 20. Similarly, connecting member 17 is provided at both front ends of lower arms 19 and 20 to connect them to each other. A plurality of rib portions 27 are provided on the connecting member 16 for attaching seat springs 26 (FIG. 2) which are to support seat cushion 25 (FIG. 3). Similarly, a plularity of rib portions 27 are provided on the connecting member 17 for attaching seat springs 26.

A plate 18 is attached to forward ends of the lower arms 19 and 20 and an end portion of a cover member is to be secured thereto. A recess 29 is provided on the plate 18. The plate 18 is in U-shape and extends from one lower arm to the other. Seat reclining structures 32 and 33 are provided for regulating the angle of the seatback 40 by conventional methods not described in detail herein. A release lever 34(FIG. 4) is attached to one end of the release shaft 31 which is connected to one end of rod 35. The other end of the rod 35 is connected to link structure 36 and 37 for releasing the engagement of the reclining structure 32 and 33. A seat vertical control rod 39 is rotatably connected at its one end to the lower arm 19 and at its the other end to the lower arm 20 and is further connected to screw gear 42 and operating lever 41, respectively. The screw gear 42 is rotatably supported on the connecting member 17 through another gear 43. The gear 43 is engaged with gear 44 which is integrally formed with link 45 which in turn is connected to crank lever 47. The lever 47 is rotatably supported on bracket 46 which is provided on the connecting member 16.

A vertical rod 48 for controlling the height of the front side of the seat, is rotatably mounted on the lower arm 19 at its one end and is connected to the other lower arm 20 at its the other end and is further connected to a conventional latch gear (not shown) at its one end and connected to link 49 at its the other end. The latch gear is further connected to connecting link 51 and the link 49 is further connected to connecting link 52. A release lever 54 is connected to a release shaft 53 for releasing the latch gear to control the height of the front side of the seat. The shaft 53 is formed to be coaxial with the control rod 39. Seat slide structure 55 and 56 includes fixed rails 57 and 58 and slidable rails 59 and 60, respectively. One of the fixed rails is secured to bracket 61 and the other fixed rail is connected to bracket 62. Both brackets 61 and 62 are secured to the floor and are provided with latches 70 for controlling the forward and rearward movement of the seat slide structure. Attaching plates 63 and 64 are respectively secured to slidable rails 59 and 60. Each attaching plate 63 and 64 is provided with a hole 65, 66 for operatively connecting adjusting link 52, and 51 through screws.

Rear ends of the slidable rails 59 and 60 are connected to each other by connecting rod 67. At the side portion of the slidable rail 59 are provided upper bracket 68 and lower bracket 71. At the side portion of the slidable rail 60 are provided an upper bracket 69 and lower bracket 72. One end of the crank lever 47 is pivoted to the upper brackets 68 and 69. Operating lever 73 is pivoted to the lower brackets 71 and 72 for controling the forward and rearward movement of the seat slide structure 55 and 56. The lever 73 is provided with a member which is engageable with the latches 70.

In this embodiment, two connecting members 16 and 17 are provided for connecting the two seat hinges 14 and 15 and for attaching seat springs 26 thereon. Thus a conventional complex cushion pan (4 in FIGS. 6 and 7) can be avoided, which leads to cost reduction as well as weight reduction. Moreover, even when an excess load is applied to the cushion 40, through seat hinges 14 and 15, the vertical bar portion of the "L-shape" connecting member 16 serves to receive lateral force to prevent bending of the structure. The plate 18 serves to secure the end 75 of the cushion cover 74 which covers foam made cushion material 25 placed on the springs 26 (as shown on FIG. 3). Thus, the cushion 30 encloses seat hinges 14 and 15 not to be shown from outside. This frame structure of seat can be commonly used with the vertical control structure 39, 41–47.

Figure 4:
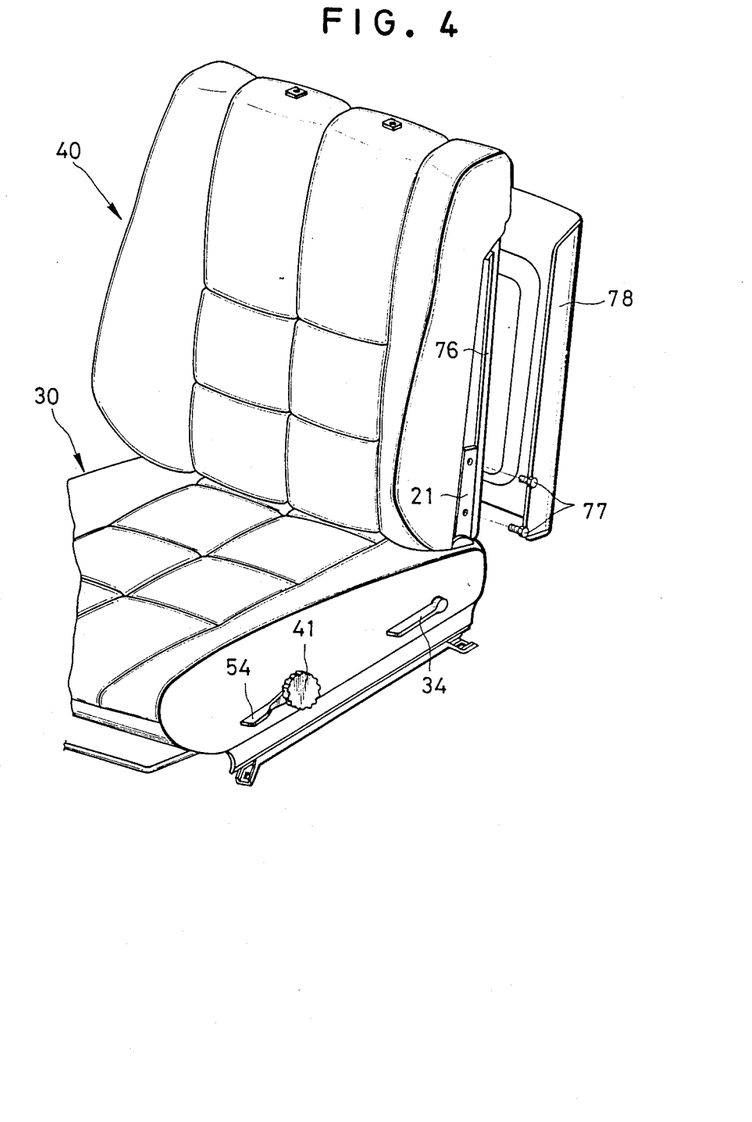
FIG. 4 is a perspective view of the seatback cushion of the present invention.
Figure 5:
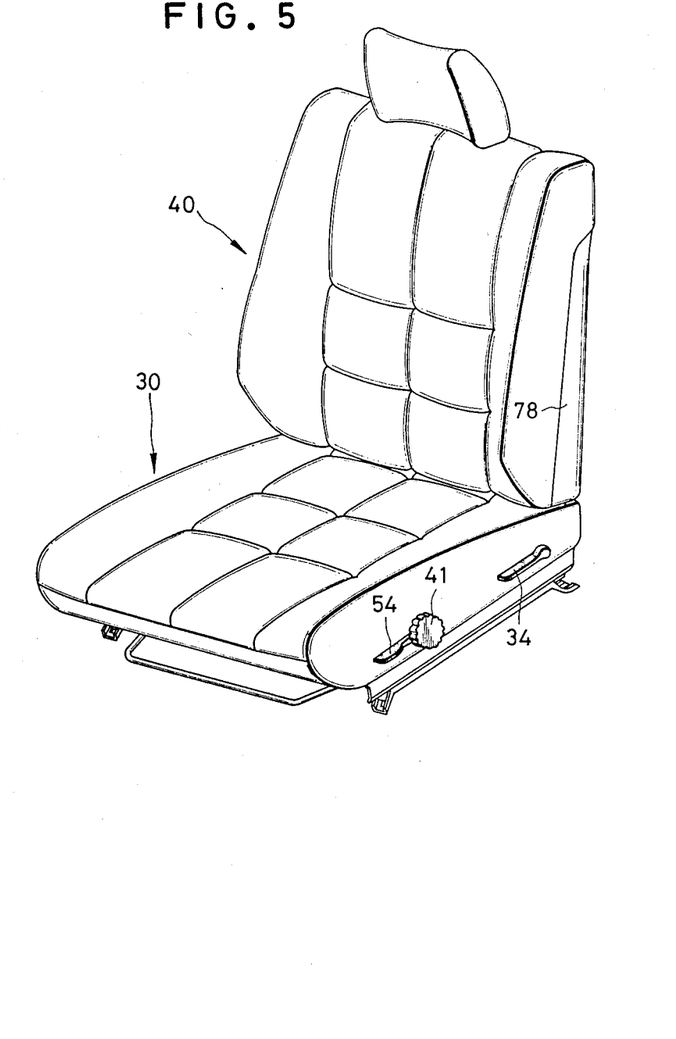
FIG. 5 is a perspective view of a seat assembly of the present invention.

As is clearly shown in FIG. 4, backframe 76 of the seatback cushion 40 is secured to the upper arms 21 of the seat hinges 14 and 15 by screws 77. A backboard 78 is then attached to the back frame 76 to form the seatback cushion 40 which is to be attached to the seat cushion 30. Such assembled condition is shown in FIG. 5. The seat hinges 14 and 15 are hidden by the backboard 78 thereby to form a simple and beautiful appearance of the seat assembly.

What we claim is:

1. A seat bottom struture for a vehicle comprising:
a pair of spaced apart fixed lower rails;
a pair of sliding rails each having a forward end and a rear end and slidably mounted on said lower rails;
two spaced apart elongated arms, each having a forward end and rear end and connected proximate their forward ends to the forward end of a corresponding one of said pair of sliding rails;
at least two connecting members extending substantially perpendicular to and connecting said arms, one of said connecting members disposed proximate said forward ends of said arms, and the other connecting member disposed proximate said rear ends of said arms;
a connecting rod extending between and connecting the rear ends of said sliding rail; and
means including said connecting rod for pivotally attaching said rod to said rear most connecting member for varying the distance between the rear most connecting member and the sliding rails.

2. A seat bottom structure as set forth in claim 1, wherein said means for pivotally attaching said rod to said rear most connecting member includes:
a seat vertical control rod having first worm gear proximate to one end and extending perpendicular to and between said arms;
a link rod disposed perpendicular to said vertical control rod having a second worm gear disposed at one end in operable engagement with said first worm gear and having a connecting portion at the end opposite the one end; and
a V-shaped crank lever pivotally attached at one end to the connecting portion of said link rod, at the other end to said connecting rod, and at the apex thereof to said rear most connecting member.

3. A seat bottom structure as set forth in claim 2, wherein the V-shaped crank lever is also pivotably attached at the apex to at least one of said arms.

4. A seat bottom structure as set forth in claim 1 further comprising seat cover material and an elongated plate having a forward portion extending between and connecting the forward ends of said arms for securing the edges of seat cover material.

5. A seat bottom structure as set forth in claim 4, wherein the forward portion of the plate is U-shaped.

6. A seat bottom structure as set forth in claim 4, wherein the plate has rear portions extending substantially along the length of said arms.

7. A seat bottom structure as set forth in claim 1 including a seat cushion spring assembly having a plurality of U-shaped end portions, and wherein said connecting members further include a plurality of spaced-apart rib portions having openings slidably retaining said end portions.

8. A seat bottom structure as set forth in claim 7, wherein said U-shaped end portions are disposed with the openings of the U-shaped end portions facing in substantially the same direction.

9. A seat bottom structure for a vehicle comprising:
a pair of spaced apart fixed lower rails;
a pair of sliding rails each having a forward end and a rear end and slidably mounted on said lower rails;
two spaced apart elongated arms, each having a forward end and rear end and connected proximate their forward ends to the forward end of a corresponding one of said pair of sliding rails;
at least two connecting members extending substantially perpendicular to and connecting said arms, one of said connecting members disposed proximate said forward ends of said arms, and the other connecting members disposed proximate said rear ends of said arms, said connecting member having a plurality of spaced apart rib portions having openings;
a connecting rod extending between and connecting the rear ends of said sliding rail; and
means including said connecting rod for pivotally attaching said rod to said rear most connecting member for varying the distance between the rear most connecting member and the sliding rails; and
a seat cushion spring assembly having a plurality of U-shaped end portions slidably retained in said openings of said spaced apart rib portions.

10. A seat bottom structure as set forth in claim 9, wherein said means for pivotably attaching said rod to said rear most connecting member includes:
a seat vertical control rod having a first worm gear proximate to one end and extending perpendicular to and between said arms;
a link rod disposed perpendicular to said vertical control rod having a second worm gear disposed at one end in operable engagement with said first worm gear and having a connecting portion at the end opposite the one end; and
a V-shaped crank lever pivotably attached at one end to the connecting portion of said link rod, at the other end to said connecting rod, and at the apex thereof to said rear most connecting member.

11. A seat bottom structure as set forth in claim 10, wherein the V-shaped crank lever is also pivotably attached at the apex to at least one of said arms.

12. A seat bottom structure as set forth in claim 9 further comprising seat cover material and an elongated plate having a forward portion extending between and connecting the forward ends of said arms for securing the edges of seat cover material.

13. A seat bottom structure as set forth in claim 12, wherein the forward portion of the plate is U-shaped.

14. A seat bottom structure as set forth in claim 13, wherein the plate has rear portions extending substantially along the length of said arms.

15. A seat bottom structure as set forth in claim 9, wherein said U-shaped end portions are disposed with the openings of the U-shaped end portions facing in substantially the same direction.

* * * * *